(12) United States Patent
Hamada et al.

(10) Patent No.: US 10,675,600 B2
(45) Date of Patent: Jun. 9, 2020

(54) MULTI-SHAFT KNEADING MACHINE (71) Applicant: The Japan Steel Works, Ltd., Tokyo (JP)

(72) Inventors: Takuya Hamada, Hiroshima (JP);
Manabu Ikeya, Hiroshima (JP);
Makoto Ishikawa, Hiroshima (JP);
Kazuhiro Kodate, Hiroshima (JP);
Takayuki Yamazawa, Hiroshima (JP);
Seiji Takamoto, Hiroshima (JP)

(73) Assignee: The Japan Steel Works, Ltd., Tokyo (JP)

( * ) Notice: Subject to any disclaimer, the term of this patent is extended or adjusted under 35 U.S.C. 154(b) by 199 days.

(21) Appl. No.: 15/562,396

(22) PCT Filed: Mar. 1, 2016

(86) PCT No.: PCT/JP2016/056252
§ 371 (c)(1),
(2) Date: Sep. 27, 2017

(87) PCT Pub. No.: WO2016/158165
PCT Pub. Date: Oct. 6, 2016

(65) Prior Publication Data
US 2018/0280902 A1    Oct. 4, 2018

(30) Foreign Application Priority Data

Mar. 27, 2015  (JP) .................................. 2015-066491

(51) Int. Cl.
*B01F 7/08*     (2006.01)
*B29C 48/40*    (2019.01)
(Continued)

(52) U.S. Cl.
CPC ................ *B01F 7/082* (2013.01); *B29B 7/46* (2013.01); *B29B 7/488* (2013.01);
(Continued)

(58) Field of Classification Search
CPC ............. B01F 7/082; B01F 2215/0049; B29C 48/2552; B29C 48/404; B29C 48/575;
(Continued)

(56) References Cited

U.S. PATENT DOCUMENTS 6,238,079 B1 *   5/2001   Watada ................... B29B 7/488
366/80

FOREIGN PATENT DOCUMENTS

JP     2000-309018 A    11/2000
JP     2007-290201 A    11/2006
(Continued)

*Primary Examiner* — Marc C Howell
(74) *Attorney, Agent, or Firm* — Knobbe, Martens, Olson & Bear, LLP (57) ABSTRACT

A multi-shaft kneading machine includes a channel and two screws rotatable around first axes of rotation. A pair of gate rods sandwich the two screws and are rotatable around second axes of rotation. Each of the pair of gate rods has two recess parts that form respective spaces through which the two screws penetrate. Each of the pair of gate rods has a first contact surface, which comes into surface contact with a screw when a gate rod is rotated to a minimum degree-of-opening position. Large diameter parts are fitted into the groove of the cylinder, and a small diameter part have a radius of curvature equal to half a distance between two second axes of rotation and smaller than a radius of curvature of the large diameter parts. The small diameter parts of the pair of gate rods are in contact with each other.

5 Claims, 5 Drawing Sheets (51) Int. Cl.
  *B29C 48/425*   (2019.01)
  *B29C 48/255*   (2019.01)
  *B29B 7/48*     (2006.01)
  *B29C 48/25*    (2019.01)
  *B29C 48/575*   (2019.01)
  *B29C 48/685*   (2019.01)
  *B29C 48/435*   (2019.01)
  *B29B 7/46*     (2006.01)
  *B29C 48/03*    (2019.01)

(52) U.S. Cl.
  CPC ........ *B29C 48/2552* (2019.02); *B29C 48/268* (2019.02); *B29C 48/404* (2019.02); *B29C 48/425* (2019.02); *B29C 48/435* (2019.02); *B29C 48/575* (2019.02); *B29C 48/686* (2019.02); *B01F 2215/0049* (2013.01); *B29C 48/03* (2019.02)

(58) Field of Classification Search
  CPC ..... B29C 48/425; B29C 48/38; B29C 48/385; B29C 48/43; B29C 48/435; B29C 48/44; B29C 48/268; B29C 48/686; B29B 7/46; B29B 7/488
  USPC .......................................................... 366/80
  See application file for complete search history.

(56) References Cited

FOREIGN PATENT DOCUMENTS

| | | | | |
|---|---|---|---|---|
| JP | 2007290201 A | * | 11/2007 | ........... B29C 48/266 |
| JP | 2009-184230 A | | 8/2009 | |
| JP | 2010-105296 A | | 5/2010 | |

* cited by examiner

Min. Degree-of-Opening Position

Fig. 2B

Max. Degree-of-Opening Position

(a) Max. Degree-of-Opening Position
(b)
(c) Min. Degree-of-Opening Position

Fig. 7A

Max. Degree-of-Opening Position

Fig. 7B

Min. Degree-of-Opening Position

MULTI-SHAFT KNEADING MACHINE

CROSS-REFERENCE TO RELATED APPLICATIONS

This application is the U.S. National Phase under 35. U.S.C. § 371 of International Application PCT/JP2016/056252, filed Mar. 1, 2016, which claims priority to Japanese Patent Application No. 2015-066491, filed Mar. 27, 2015. The disclosures of the above-described applications are hereby incorporated by reference in their entirety.

TECHNICAL FIELD

The present invention relates to a multi-shaft kneading machine, and particularly to the structure of a gate rod used in a gate part.

BACKGROUND ART

A multi-shaft kneading machine is known that performs various kinds of processing that is aimed at homogenizing, modifying the properties of and adding materials to synthetic resin material. A biaxial kneading machine described in Patent Literature 1, which is an example of the multi-shaft kneading machine, has a cylinder having an inner space and two screws that extend in parallel with each other in the cylinder. The processing mentioned above is performed by the two screws rotating in the same direction or in opposite directions. Synthetic resin material is supplied from a supply port of the multi-shaft kneading machine, is conveyed by a conveying part, is kneaded by a kneading part, and is then discharged from an ejection port.

A gate part that adjusts the degree of kneading is provided on the outlet side of the kneading part. The gate part adjusts the degree of kneading of the synthetic resin material in the kneading part by variably controlling the sectional area of a channel through which the synthetic resin material passes. JP2000-309018A describes a gate part having gate rods. A pair of gate rods that are opposite to each other and that sandwich two screws is provided. The gate rod can be rotated around an axis of rotation that is orthogonal to a direction in which the screws extend. The gate rod includes two recess parts. Corresponding recess parts of the pair of gate rods are opposite to each other in order to form spaces through which the two screws penetrate. The sectional area of the channel around the screw is changed by the rotation of the gate rods. As a result, the degree of kneading of the synthetic resin material can be adjusted. The gate rod has a generally cylindrical outer shape.

The gate rods can be rotated between a minimum degree-of-opening position where the area of the channel that is formed by the screw and the gate rods is minimized and a maximum degree-of-opening position where the area of the channel is maximized. The recess part of the gate rod has a channel forming surface that forms a part of the channel and a first contact surface that is cut out from the channel forming surface. When the gate rods are rotated to the minimum degree-of-opening position, the first contact surfaces come into surface contact with the outer surface of the screw in order to limit the channel. The channel forming surface has the same radius of curvature as the cylinder, and the first contact surface has the same radius of curvature as the screw.

Patent Literature 1: JP2000-309018A

SUMMARY OF INVENTION

The area of the channel at the minimum degree-of-opening position is determined by the range in which the first contact surface is in surface contact with the screw, and the larger the range is, the smaller the area of the channel becomes. In the biaxial kneading machine described in JP2000-309018A, the section is circular with generally the same radius. When the gate rods are rotated to the minimum degree-of-opening position, the first contact surfaces cannot be positioned sufficiently close to each other because the radius of curvature of the channel forming surface is larger than the radius of curvature of the first contact surface. This generates regions on both sides of the screw where the channel cannot be closed. Since the channel cannot be sufficiently limited, it is impossible to ensure a sufficient range for adjusting the degree of kneading.

The object of the present invention is to provide a multi-shaft kneading machine that is able to sufficiently limit the channel and thereby ensure a sufficient range for adjusting the degree of kneading.

The multi-shaft kneading machine comprises: a cylinder that includes grooves on an inner wall thereof; at least two screws that extend in the cylinder in parallel with each other and that can be rotated around first axes of rotation; and a pair of gate rods that sandwich said at least two screws and that are opposite to each other, the gate rods being rotatable on the grooves of the cylinder around respective second axes of rotation that are orthogonal to the first axes of rotation. Each of the pair of gate rods has at least two recess parts, and the recess parts that are opposite to each other form respective spaces through which said at least two screws penetrate. Each of the pair of gate rods include: a first contact surface that comes into surface contact with the screw when the gate rod is rotated to a minimum degree-of-opening position where an area of a channel that is formed between the gate rod and the screw is minimized; a large diameter part that is fitted into the groove of the cylinder; and a small diameter part having a radius of curvature that is equal to half a distance between two second axes of rotation and that is smaller than a radius of curvature of the large diameter part. The small diameter parts of the pair of gate rods are in contact with each other.

In the present invention, the pair of gate rods has the small diameter parts, and the small diameter parts are in contact with each other. Thus, when the gate rods are rotated to the minimum degree-of-opening positions, the first contact surfaces can be positioned close to each other. As a result, the area of the channel can be reduced at the minimum degree-of-opening position.

According to the present invention, a multi-shaft kneading machine can be provided that is able to sufficiently limit the channel and thereby ensure a sufficient range for adjusting the degree of kneading.

LIST OF REFERENCE NUMERALS 1 multi-shaft kneading machine
4 screw
5 gate rod
6 groove
7 wall part
8 intermediate part
9 recess part
21 first contact surface
22 second contact surface
23 third contact surface
24 large diameter part
25 small diameter part
26 channel forming surface
A1 first axis of rotation
A2 second axis of rotation

DESCRIPTION OF EMBODIMENTS

An embodiment of a multi-shaft kneading machine of the present invention will be described with reference to the drawings. An embodiment of a biaxial kneading machine will be described here, but more generally, the present invention can be applied to a multi-shaft kneading machine having a plurality of screws. In the following description and figures, the direction in which the screws extend or the direction of first axis of rotation A1 is referred to as the x-direction. The direction in which gate rods 5 extend or the direction of second axis of rotation A2 is referred to as the y-direction. The direction that is orthogonal both to the x-direction and to the y-direction is referred to as the z-direction. The z-direction corresponds to the vertical direction. Furthermore, a plane that contains first axis of rotation A1 and that has a normal line in the z-direction is referred to as reference plane P.

Moreover, in this description, the terms "first to third contact surfaces" are used for the gate rod, and the terms "contact", "surface contact", "abut" and the like are used for the positional relationship between the gate rod and the screw or between the upper and lower gate rods. However, these terms include not only a case where there is an actual contact or abutting but also a case where these are opposite to each other with a slight gap therebetween.

Figure 1:
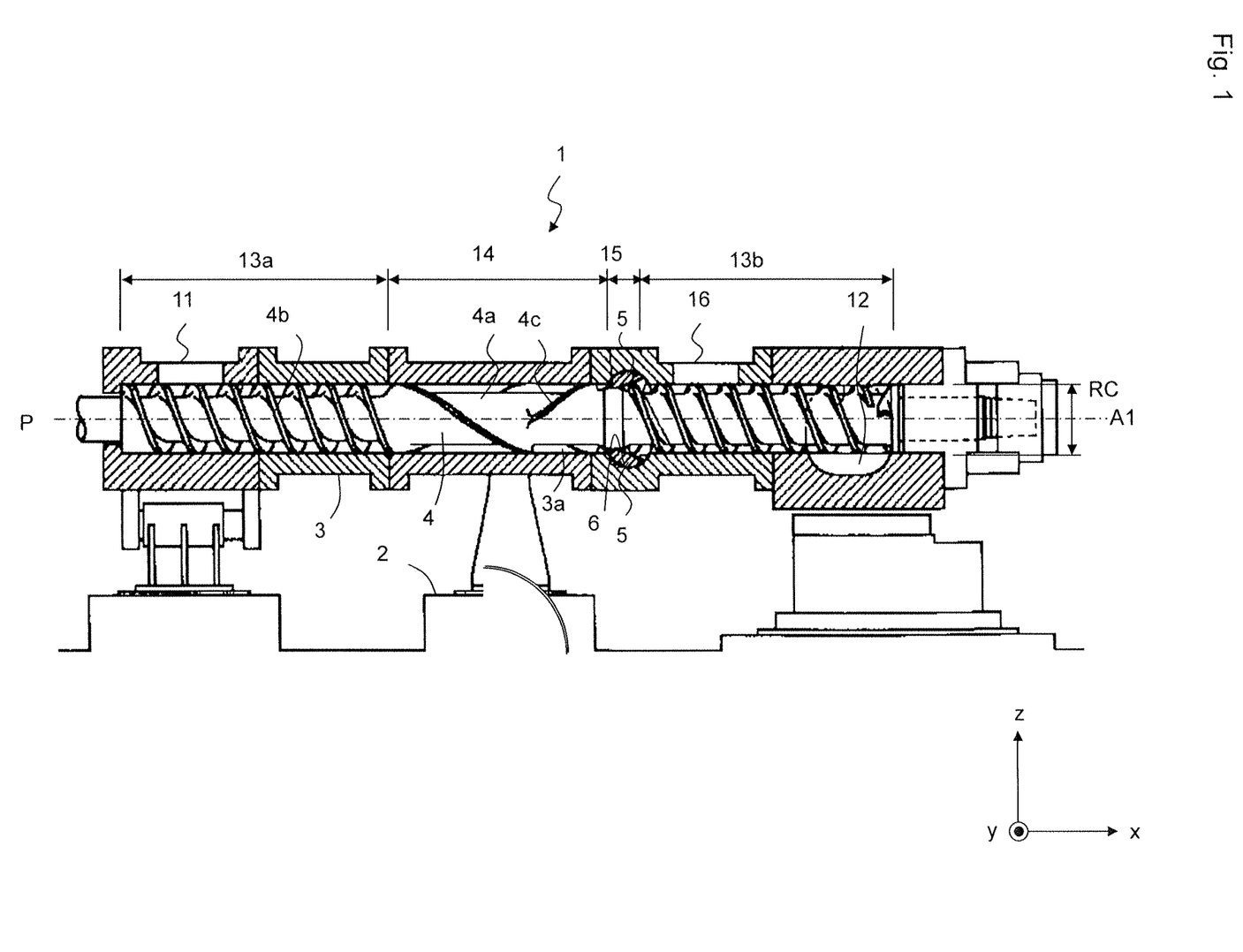
FIG. 1 is a schematic sectional view of a multi-shaft kneading machine of the present invention.
Figure 2A:
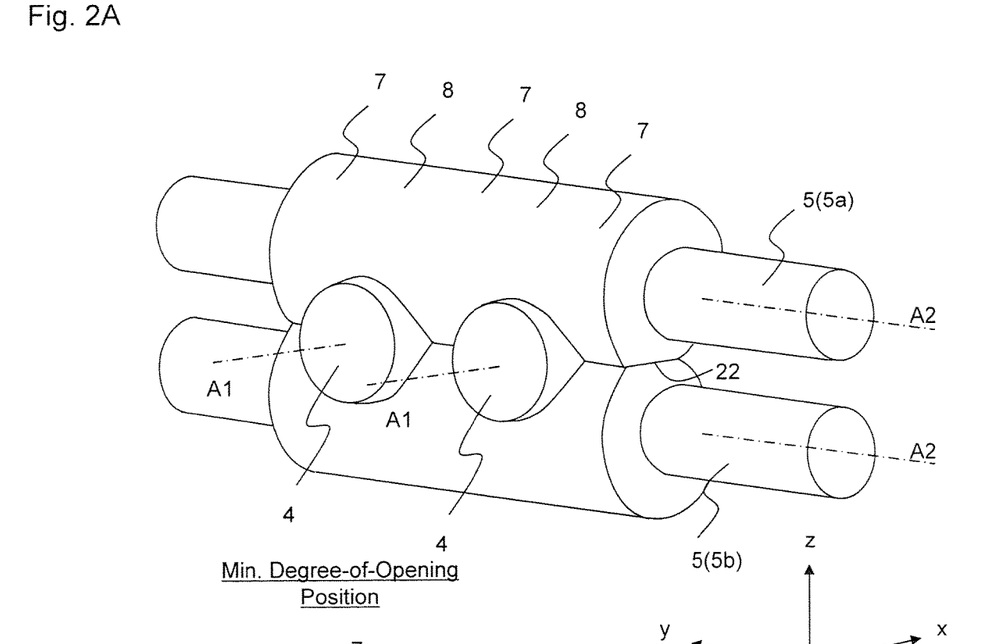
FIG. 2A is a schematic perspective view of the screws and the gate rods at the minimum degree-of-opening position.
Figure 2B:
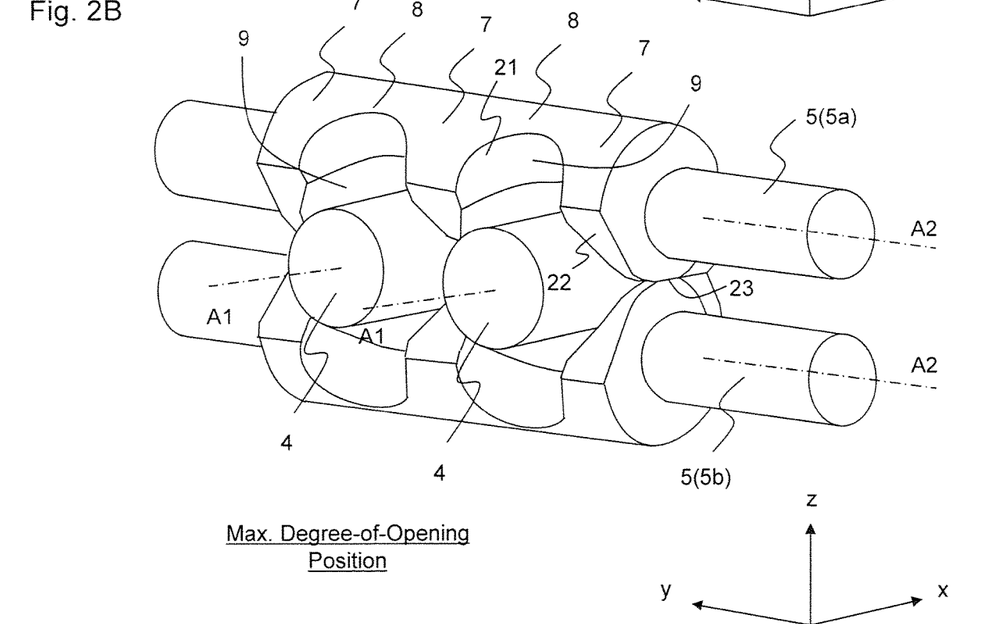
FIG. 2B is a schematic perspective view of the screws and the gate rods at the maximum degree-of-opening position.

FIG. 1 illustrates a schematic sectional view of a multi-shaft kneading machine. FIGS. 2A and 2B are schematic perspective views of the screws and the gate rods, wherein FIG. 2A illustrates a state where the gate rods have been rotated to the minimum degree-of-opening position and FIG. 2B illustrates a state where the gate rods have been rotated to the maximum degree-of-opening position, respectively. Multi-shaft kneading machine 1 has cylinder 3 that is supported by base 2 and two screws 4 that extend in space 3a of cylinder 3 in the x-direction in parallel with each other. Two screws 4 are arranged in the y-direction, but the second screw is behind illustrated screw 4 and is not illustrated in FIG. 1. Two screws 4 are connected to rotation and driving means (not shown) and can be rotated around first axes of rotation A1 in the same direction or in directions opposite to each other. Two screws 4 have the same shape and outer diameter.

Supply port 11 for resin material is provided on one side of cylinder 3, and ejection port 12 for the resin material is provided on the other side. Conveying part 13a, kneading part 14, gate part 15, and conveying part 13b are provided between supply port 11 and ejection port 12, as seen from supply port 11 toward ejection port 12. Conveying part 13a transfers the resin material, which is supplied from supply port 11, to kneading part 14. Kneading part 14 kneads the resin material that is fed from conveying part 13a and performs various kinds of processing aimed at homogenizing the properties of the resin material, modifying the properties of the resin material and adding materials to the resin material. Gate part 15 variably controls the channel of the resin material and adjusts the degree of kneading of the resin material. Details of gate part 15 will be described later. Conveying part 13b transfers the resin material whose degree of kneading has been adjusted to ejection port 12. Conveying part 13b is provided with vent port 16 that removes volatile components. Vent port 16 may be omitted depending on the types of resin materials. Ejection port 12 discharges the resin material whose degree of kneading has been adjusted to the outside of the multi-shaft kneading machine.

Each screw 4 has rotor 4a having first axis of rotation A1 as a center axis and flights 4b, 4c in the form of ribs that are provided on the outer periphery of rotor 4a. Flights 4b are provided at portions of each screw 4 that correspond to conveying parts 13a, 13b and extend continuously and spirally along the outer periphery of rotor 4a around first axis of rotation A1. Discontinuous flights 4c are provided at a portion of each screw 4 that corresponds to kneading part 14 and extend spirally along the outer periphery of rotor 4a around first axis of rotation A1. Flights 4b, 4c are not provided at a portion of each screw 4 that corresponds to gate part 15, and only cylindrical-shaped rotor 4a without projections or recesses is provided. In gate part 15, screw 4 forms channel 18 of the resin material together with gates rod 5, which will be described below. Screw 4 is formed by axially connecting separate screw elements that correspond to sections, such as conveying parts 13a, 13b, kneading part 14, gate part 15, but screw 4 may also be formed integral.

A pair of gate rods 5 (may be hereinafter called upper gate rod 5a and lower gate rod 5b) that sandwich two screws 4 and that are opposite to each other in the z-direction is provided in gate part 15. Each gate rod 5 extends in the y-direction and can be rotated around second axis of rotation A2 that is orthogonal to first axis of rotation A1. Through holes (not shown) are formed on both sides of cylinder 3 that sandwich screws 4 in the y-direction. Each gate rod 5 penetrates through the through holes and is rotatably supported by cylinder 3. Grooves 6 that extend in the y-direction are formed on the inner surface of cylinder 3. Groove 6 has a partially cylindrical shape that is formed by cutting a cylinder along a plane that is parallel with the center axis of the cylinder, and the radius of curvature of groove 6 is substantially equal to the radius of large diameter parts 24, 27 (which will be described later) of gate rod 5. Gate rod 5 is fitted into groove 6 and can be rotated in groove 6.

Figure 3A:
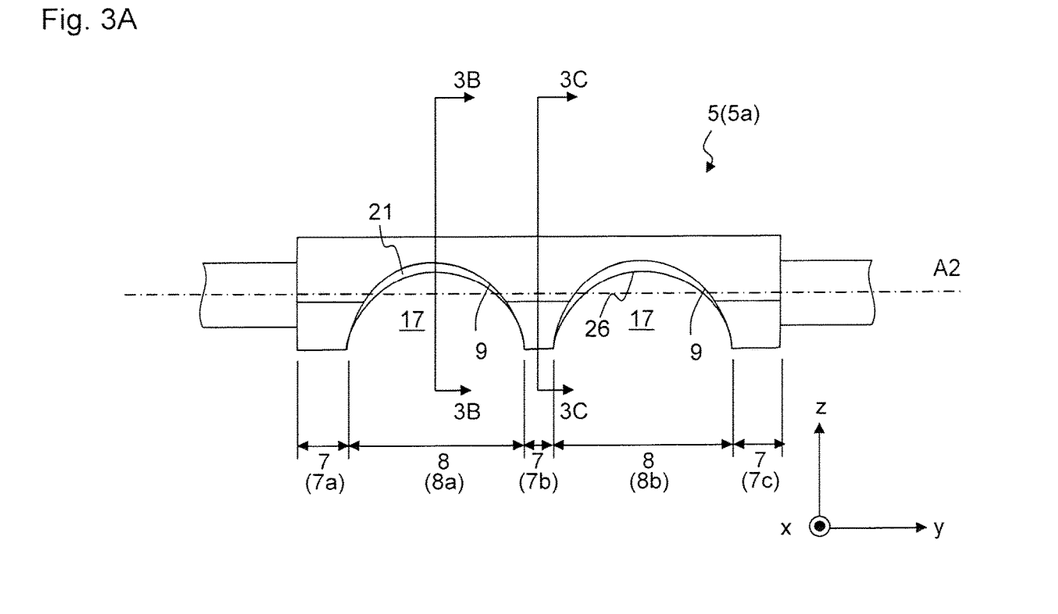
FIG. 3A is a front view of the gate rod.
Figure 3B:
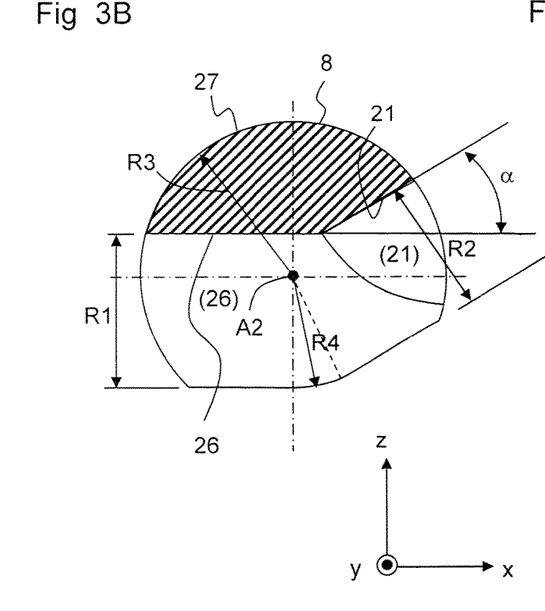
FIG. 3B is a sectional view of the gate rod along line 3B-3B in FIG. 3A.
Figure 3C:
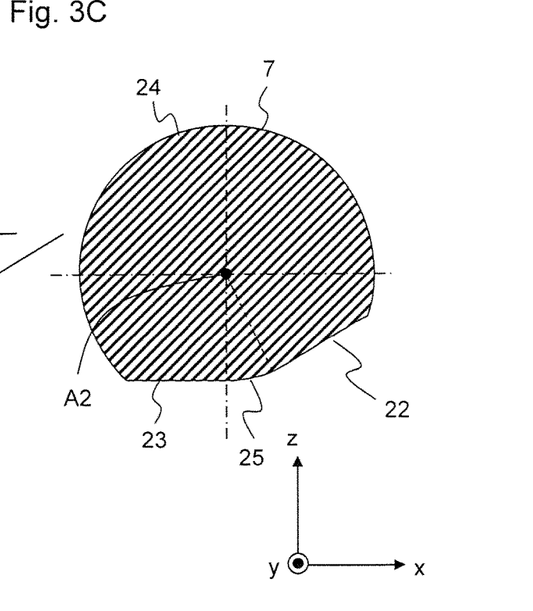
FIG. 3C is a sectional view of the gate rod along line 3C-3C in FIG. 3A.

FIGS. 3A to 3C are schematic views of the gate rod, wherein FIG. 3A illustrates a front view of the gate rod, FIG. 3B illustrates a sectional view of an intermediate part taken along line 3B-3B in FIG. 3A, and FIG. 3C illustrates a sectional view of a wall part taken along line 3C-3C. FIGS. 3A to 3C illustrate upper gate rod 5a, but lower gate rod 5b has the same constitution as upper gate rod 5a. Each of the pair of gate rods 5 has three wall parts 7 that are arranged along the second axis of rotation A2 or in the y-direction and two intermediate parts 8 that are located between two adjacent wall parts 7, respectively. Two intermediate parts 8 and three wall parts 7 are alternately located along second axis of rotation A2, and more specifically, wall part 7a, intermediate part 8a, wall part 7b, intermediate part 8b, and wall part 7c are located in this order along second axis of rotation A2.

Each of two intermediate parts 8 includes recess part 9. Recess part 9 has a semi-cylindrical groove shape that extends in the x-direction that is parallel with first axis of rotation A1 of screw 4. Wall parts 7 and intermediate parts 8 (recess parts 9) of two gate rods 5 that correspond to each other are opposite to each other. That is, wall part 7a of upper gate rod 5a is opposite to wall part 7a of lower gate rod 5b, wall part 7b of upper gate rod 5a is opposite to wall part 7b of lower gate rod 5b, wall part 7c of upper gate rod 5a is opposite to wall part 7c of lower gate rod 5b, intermediate part 8a of upper gate rod 5a is opposite to intermediate part 8a of lower gate rod 5b, and intermediate part 8b of upper gate rod 5a is opposite to intermediate part 8b of lower gate rod 5b. Recess parts 9 of intermediate parts 8a, 8b that are opposite to each other form spaces 17 through which two screws 4 penetrate or channels 18 between intermediate parts 8a, 8b and screws 4. Gate rods 5 can be rotated around second axes of rotation A2 between the minimum degree-of-opening position and the maximum degree-of-opening position, thereby changing the areas of channels 18 between intermediate parts 8a, 8b and screw 4. The area of the channel (degree of opening) and the flow rate are minimized or ideally become zero at the minimum degree-of-opening position. The area of the channel (degree of opening) and the flow rate are maximized at the maximum degree-of-opening position.

Wall part 7 includes, in a plane that is orthogonal to second axis of rotation A2, large diameter part 24, small diameter part 25 that is located on a side opposite to large diameter part 24, second contact surface 22 that is located between large diameter part 24 and small diameter part 25 and third contact surface 23 that is located on a side opposite to second contact surface 22 between large diameter part 24 and small diameter part 25. Second contact surface 22 and third contact surface 23 are planar, and large diameter part 24 and small diameter part 25 are arcs whose centers are positioned on rotating center A2 (second axis of rotation A2), as seen on the x-z plane. Large diameter part 24 is fitted into groove 6 of cylinder 3, and has radius R3 that is substantially equal to the radius of curvature of groove 6 of cylinder 3. Radius R4 of small diameter part 25 is smaller than radius R3 of large diameter part 24. Small diameter part 25 is a curved surface that connects second contact surface 22 to third contact surface 23, and is smoothly connected both to second contact surface 22 and to third contact surface 23. Although described later in detail, second contact surface 22 comes into surface contact with second contact surface 22 of corresponding wall part 7 of the other gate rod 5 when first contact surface 21 abuts against the outer surface of screw 4, that is, when gate rod 5 is rotated to the minimum degree-of-opening position. Third contact surface 23 comes into surface contact with third contact surface 23 of corresponding wall part 7 of the other gate rod 5 when the area of the channel is maximized, that is, when gate rod 5 is rotated to the maximum degree-of-opening position. Second contact surface 22 and third contact surface 23 are planar in the embodiment, but they may be curved. That is, second contact surfaces 22 may be constructed such that they do not come into surface contact with each other and third contact surfaces 23 may be constructed such that they do not come into surface contact with each other.

Intermediate part 8 has channel forming surface 26, first contact surface 21, and large diameter part 27 in a plane that is orthogonal to second axis of rotation A2. Large diameter part 27 is fitted into groove 6 of cylinder 3, and has radius R3 that is substantially equal to the radius of curvature of groove 6 of cylinder 3. Large diameter part 27 of intermediate part 8 is a curved surface that is continuous with large diameter part 24 of wall part 7, and has the same radius R3 as large diameter part 24. Channel forming surface 26 is a semi-cylindrical surface that, together with corresponding channel forming surface 26 of the other gate rod 5, forms a cylindrical inner wall that is continuous with the inner wall of cylinder 3 when gate rod 5 is rotated to the maximum degree-of-opening position. Therefore, channel forming surface 26 has the same radius of curvature R1 as the inner diameter of cylinder 3. Channel forming surface 26 and the inner wall of cylinder 3 form channel 18 for the resin material between them and the outer surface of screw 4.

First contact surface 21 is a semi-cylindrical cutout that is formed in the front end or the rear end of recess part 9 of intermediate part 8 with regard to the x-direction, and the center axis of first contact surface 21 is inclined by angle α with respect to the center axis of channel forming surface 26. First contact surface 21 has the same radius of curvature R2 as the radius of screw 4. Therefore, first contact surface 21 comes into surface contact with the outer surface of screw 4 when gate rod 5 is rotated to the minimum degree-of-opening position. Note that the white irregular-pentagon-like area and the white substantially triangular area denoted with reference numerals (26) and (21) in FIG. 3B indicate the curved surfaces of channel forming surface 26 and first contact surface 21 that exist behind the 3B-3B section, respectively. Since the radius of curvature R1 (=the inner diameter of the cylinder) of channel forming surface 26 is larger than the radius of curvature R2 (=the diameter of the screw) of first contact surface 21, the area of first contact surface 21 is smaller than the area of channel forming surface 26 in this figure.

As described above, radius R4 of small diameter part 25 is smaller than radius R3 of large diameter part 24, but the relationship between radius R4 of small diameter part and radius of curvature R2 of first contact surface 21 is preferably R4<R2.

Figure 4:
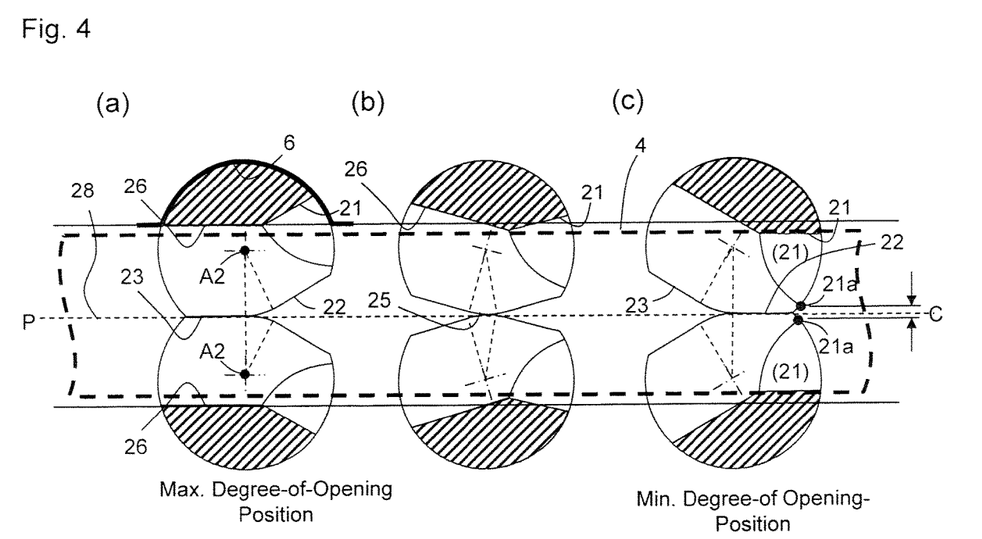
FIG. 4 is a conceptual view illustrating the opening and closing operation of the gate rod.
Figure 5A:
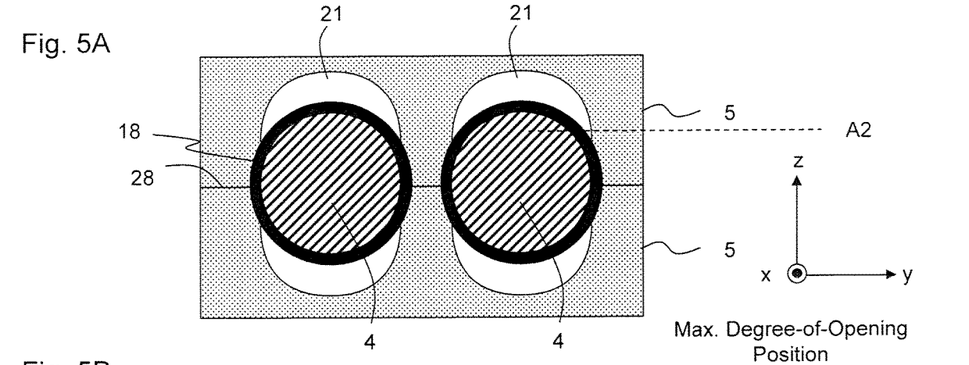
FIG. 5A is a conceptual view illustrating the gate rod at the maximum degree-of-opening position.
Figure 5B:
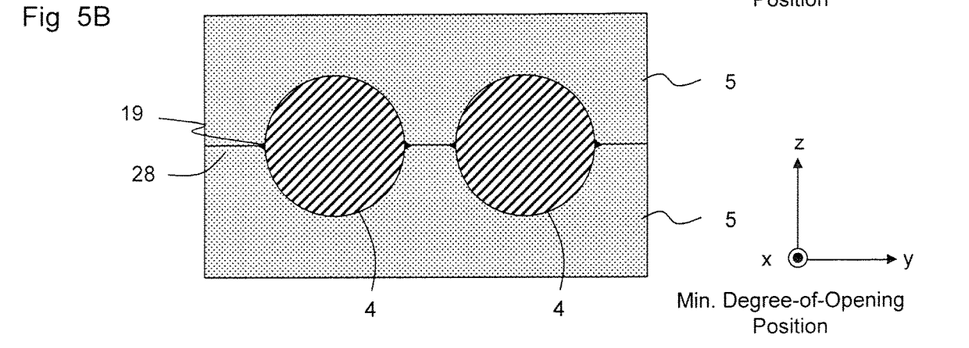
FIG. 5B is a conceptual view illustrating the gate rod at the minimum degree-of-opening position.

Next, a method of variably controlling the area of the channel at gate part 15 will be explained. FIG. 4 illustrates an operation of gate rod 5, as seen from the y-direction, and FIGS. 5A, 5B illustrate the operation of gate rod 5, as seen from the x-direction. Part (a) of FIG. 4 and FIG. 5A illustrates two gate rods 5, each positioned at the maximum degree-of-opening position (the maximum flow rate position). At the maximum degree-of-opening position, third contact surfaces 23 of two gate rods 5 are in contact with each other, and two channel forming surfaces 26 form a cylindrical inner wall. Annular channel 18 (the black painted area in FIG. 5A) is formed between the outer surface of screw 4 and channel forming surfaces 26. First contact surfaces 21 of gate rods 5 on the channel inlet side are accommodated in grooves 6. Two gate rods 5 are arranged such that respective second axes of rotation A2 are away from reference plane P by radius R4 of small diameter part 25 and are in contact with each other to form contact part 28 on reference plane P.

In order to reduce the area of the channel, two gate rods 5 are rotated around respective second axes of rotation A2 in directions opposite to each other. As illustrated in part (b) of FIG. 4, two gate rods 5 are rotated along small diameter part 25, and channel forming surfaces 26 are inclined with respect to reference plane P. The boundary between channel forming surface 26 and first contact surface 21 moves (protrudes) into the channel, thereby the area of the channel is reduced. Since the area of the channel is largely changed with a slight rotation of gate rods 5, the degree of opening can be rapidly adjusted. First contact surfaces 21 come into surface contact with the outer surface of screw 4 and block the channel by two gate rods 5 being further rotated in directions opposite to each other to the respective minimum degree-of-opening positions, as illustrated in part (c) of FIG. 4 and in FIG. 5B.

Note that since the distances from respective second axes of rotation A2 of two gate rods 5 to reference plane P, that is, radii R4 of the small diameter parts are set such that R4<R2, where R2 is the radius of curvature of first contact surface 21 (=the diameter of the screw) in the embodiment, gate rod 5 is prevented from interfering with screw 4 during the operation of gate rod 5. If R4>R2, the boundary between channel forming surface 26 and first contact surface 21 will interfere with screw 4, and this portion needs to be chamfered, as needed. Thus, diameter R4 of the small diameter part is preferably slightly smaller than diameter R2 of the screw.

Figure 6:
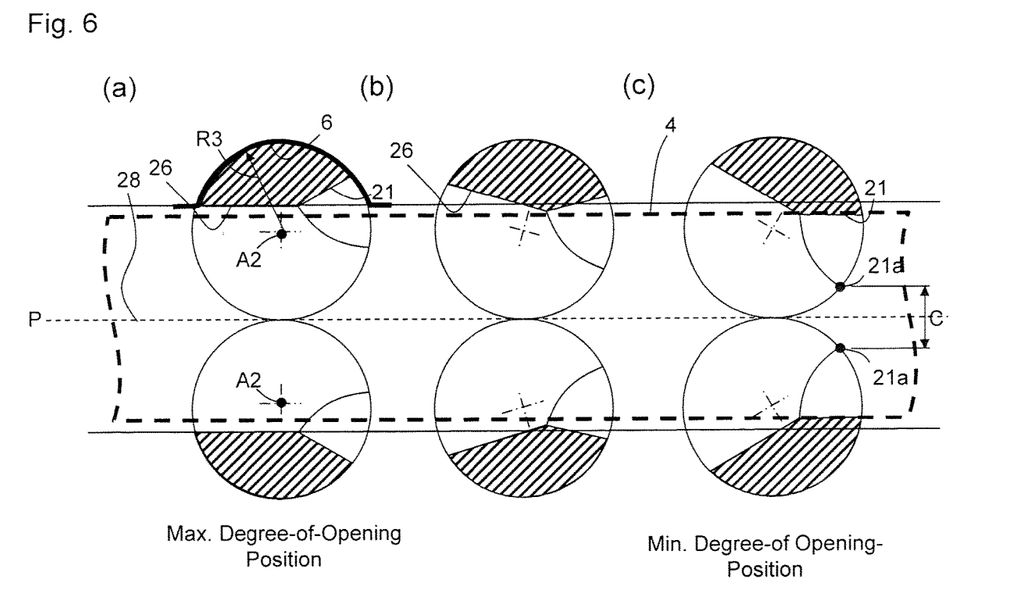
FIG. 6 is a conceptual view illustrating the opening and closing operation of a conventional gate rod.
Figure 7A:
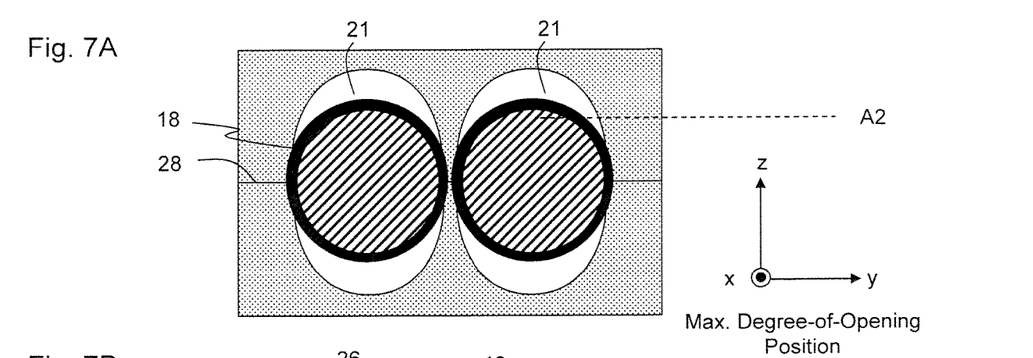
FIG. 7A is a conceptual view of the gate rod at the maximum degree-of-opening position in prior art.
Figure 7B:
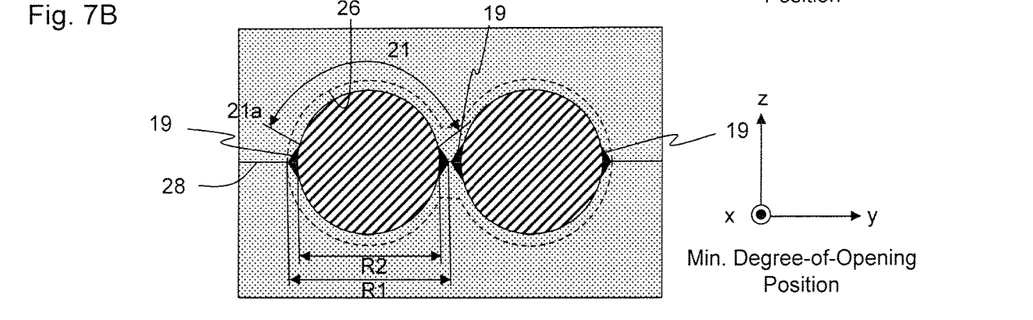
FIG. 7B is a conceptual view of the gate rod at the minimum degree-of-opening position in prior art.

FIGS. 6, 7A, and 7B are views similar to FIGS. 4, 5A, and 5B based on the configuration described in Patent Literature 1 (hereinafter referred to as Comparative example). For comparison with the present invention, the distances from second axes of rotation A2 of two gate rods 5 to reference plane P, the outer diameter of screw 4 and the corresponding radius of curvature of first contact surface 21, the inner diameter of cylinder 3 and the corresponding radius of curvature of channel forming surface 26, and angle α formed between first contact surface 21 and channel forming surface 26 are the same as those in FIGS. 4, 5A and 5B. Part (a) of FIG. 6 and FIG. 7A illustrate gate rods 5 at the maximum degree-of-opening position. Channel forming surfaces 26 of two gate rods 5 form a cylindrical channel wall at the maximum degree-of-opening positions. Annular channel 18 (the black painted area in FIG. 7A) is formed between the outer surface of screw 4 and channel forming surfaces 26. First contact surfaces 21 of gate rods 5 on the channel inlet side are accommodated in grooves 6.

In order to reduce the area of the channel, two gate rods 5 are rotated around respective second axes of rotation A2 in directions opposite to each other. As illustrated in part (b) of FIG. 6, two gate rods 5 are rotated along the cylindrical outer peripheral parts, and channel forming surfaces 26 are gradually inclined with respect to reference plane P. The boundary between channel forming surface 26 and first contact surface 21 moves (protrudes) into the channel, thereby the area of the channel is reduced. First contact surfaces 21 come into surface contact with the outer surface of screw 4 and block the channel by two gate rods 5 being further rotated in the directions opposite to each other, as illustrated in part (c) of FIG. 6 and in FIG. 7B.

Part (c) of FIG. 4 and part (c) of FIG. 6 illustrate interval C between end portions 21a of the boundaries between channel forming surfaces 26 and first contact surfaces 21. End portion 21a is a part of first contact surface 21 that is positioned closest to contact part 28. Interval C corresponds to the area where first contact surface 21 is not in contact with screw 4, that is, region 19 where the channel cannot be blocked. In Comparative example, interval C is large, and large region 19 (the black painted area in FIG. 7B) is generated on both sides of the channel. This is because the radius of curvature R1 of channel forming surface 26 is larger than the radius of curvature R2 of first contact surface 21, and therefore channel forming surface 26 is larger than first contact surface 21, and thus, as illustrated in FIG. 7B, a part of screw 4 in the vicinity of reference plane P cannot be covered by first contact surface 21 of a cylindrical gate rod if the cylindrical gate rod has a uniform radius that is equal to the distance from reference plane P to second axis of rotation A2.

In the embodiment, the distance between reference plane P and second axis of rotation A2 is equal to radius R4 of small diameter part 25, and radius R1 of channel forming surface 26 is larger than radius R2 of first contact surface 21. Therefore, there is no difference in that channel forming surface 26 is larger than first contact surface 21. However, end portion 21a of first contact surface 21 can be arranged in the vicinity of reference plane P in the embodiment due to the provision of large diameter part 24 and small diameter part 25. Thus, end portion 21a of first contact surface 21 is positioned closer to contact part 28. As a result, interval C is reduced, and channel 19 in the vicinity of contact part 28 is limited.

Other advantages of the present invention will be summarized below.

(1) In Comparative example, screw 4 requires a certain length of a diameter in order to limit region 19 on both sides of the channel to be as small as possible, which cannot be blocked. On the other hand, since there is no limitation on the diameter of screw 4 in the embodiment, the diameter can be reduced in accordance with the strength of screw 4. This leads not only to a reduction of material cost of screw 4 but also to a substantial increase in the adjustment range of the channel due to the expansion of the channel.

(2) In Comparative example, angle α between first contact surface 21 and channel forming surface 26 may be increased in order to limit channel 19 in the vicinity of the contact part. As a result, end portion 21a of first contact surface 21 can be positioned closer to contact part 28. However, if angle α is increased, then it would be difficult to ensure the strength of gate rod because the sectional area of intermediate part 8 is decreased. Moreover, since angle α is equal to the rotational angle between the maximum degree-of-opening position and the minimum degree-of-opening position, any increase in angle α deteriorates the advantage of the gate rod of being opened and closed quickly. As can be understood from the comparison between FIGS. 4 and 6, it is ensured that intermediates parts 8 of the embodiment have substantially the same sections as those of Comparative example, and since angle α is also about the same level, the advantage of the gate rod of being opened and closed quickly will not be diminished.

(3) Moreover, in the embodiment, third contact surfaces 23 of two gate rods 5 are in surface contact with each other at the maximum degree-of-opening position. Third contact surface 23 functions as a stopper for gate rod 5 at the maximum degree-of-opening position and prevents gate rod 5 from being further rotated beyond the maximum degree-of-opening position. Similarly, second contact surface 22 functions as a stopper for gate rod 5 at the minimum degree-of-opening position. Thus, it is ensured that gate rod 5 is rotated only between the maximum degree-of-opening position and the minimum degree-of-opening position.

The present invention may be applied not only to a multi-shaft kneading machine in which the shafts have the same diameter but also to a multi-shaft kneading machine in which the shafts have different diameters.

What is claimed is:

1. A multi-shaft kneading machine comprising:
    a cylinder that includes grooves on an inner wall thereof;
    at least two screws that extend in the cylinder in parallel with each other and that can be rotated around first axes of rotation; and
    a pair of gate rods that sandwich said at least two screws and that are opposite to each other, the gate rods being rotatable on the grooves of the cylinder around respective second axes of rotation that are orthogonal to the first axes of rotation, wherein
    each of the pair of gate rods has at least two recess parts, and the recess parts that are opposite to each other form respective spaces through which said at least two screws penetrate; and
    each of the pair of gate rods includes:
        a first contact surface that comes into surface contact with the screw when the gate rod is rotated to a minimum degree-of-opening position where an area of a channel that is formed between the gate rod and the screw is minimized;
        a large diameter part that is fitted into the groove of the cylinder; and
        a small diameter part having a radius of curvature that is equal to half a distance between two second axes of rotation and that is smaller than a radius of curvature of the large diameter part, wherein
    the small diameter parts of the pair of gate rods are in contact with each other.

2. The multi-shaft kneading machine according to claim 1, wherein
    each of the pair of gate rods has two intermediate parts that includes the recess parts and three wall parts that are located to alternate with the two intermediate parts, and the intermediate parts of the pair of gate rods are opposite to each other and the wall parts of the pair of gate rods are opposite to each other.

3. The multi-shaft kneading machine according to claim 2, wherein
    the wall part has a second contact surface that is located between the large diameter part and the small diameter part, and the second contact surface comes into surface contact with the second contact surface of the opposite wall part when the gate rod is rotated to the minimum degree-of-opening position.

4. The multi-shaft kneading machine according to claim 2, wherein
    the wall part has a third contact surface that is located on a side opposite to the second contact surface between the large diameter part and the small diameter part, and the third contact surface comes into surface contact with the third contact surface of the opposite wall part when the gate rod is rotated to the maximum degree-of-opening position where an area of the channel is maximized.

5. The multi-shaft kneading machine according to claim 3, wherein
    the wall part has a third contact surface that is located on a side opposite to the second contact surface between the large diameter part and the small diameter part, and the third contact surface comes into surface contact with the third contact surface of the opposite wall part when the gate rod is rotated to the maximum degree-of-opening position where an area of the channel is maximized.

* * * * *